(12) United States Patent
He et al.

(10) Patent No.: US 12,550,196 B2
(45) Date of Patent: Feb. 10, 2026

(54) RANDOM ACCESS MESSAGE TRANSMISSIONS FOR REDUCED CAPABILITY USER EQUIPMENT

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 842 days.

(21) Appl. No.: 17/593,517

(22) PCT Filed: Oct. 14, 2020

(86) PCT No.: PCT/CN2020/120971
§ 371 (c)(1),
(2) Date: Sep. 20, 2021

(87) PCT Pub. No.: WO2022/077293
PCT Pub. Date: Apr. 21, 2022

(65) Prior Publication Data
US 2022/0312498 A1    Sep. 29, 2022

(51) Int. Cl.
*H04W 74/0833* (2024.01)
*H04L 1/08* (2006.01)
(Continued)

(52) U.S. Cl.
CPC .......... *H04W 74/0841* (2013.01); *H04L 1/08* (2013.01); *H04W 24/08* (2013.01);
(Continued)

(58) Field of Classification Search
None
See application file for complete search history.

(56) References Cited

U.S. PATENT DOCUMENTS

2019/0319823 A1* 10/2019 Akkarakaran ........ H04W 76/27
2019/0364599 A1   11/2019 Islam et al.
(Continued)

FOREIGN PATENT DOCUMENTS

CN      110278615      9/2019
WO      2019/096679    5/2019
(Continued)

*Primary Examiner* — Saad Khawar
(74) *Attorney, Agent, or Firm* — Fay Kaplun & Marcin, LLP (57) ABSTRACT

A base station and a user equipment (UE) may exchange messages to perform a Random Access Channel (RACH) procedure. The UE performs measurements on a plurality of signal synchronization blocks (SSBs), selects M physical random access channel (PRACH) groups based on one or more of the measured SSBs satisfying a predetermined threshold, provides the measurements for the M PRACH groups to a base station in an initial access transmission for a RACH procedure and monitors for a random access response (RAR) message based on a repetition number for the RAR message indicated by the base station.

16 Claims, 8 Drawing Sheets

(51) Int. Cl.
  *H04W 24/08* (2009.01)
  *H04W 56/00* (2009.01)
  *H04W 72/0446* (2023.01)
  *H04W 72/0453* (2023.01)
  *H04W 74/00* (2009.01)
  *H04W 74/08* (2024.01)
(52) U.S. Cl.
  CPC ..... *H04W 56/001* (2013.01); *H04W 72/0446* (2013.01); *H04W 72/0453* (2013.01); *H04W 74/006* (2013.01); *H04W 74/0866* (2013.01)

(56) References Cited

U.S. PATENT DOCUMENTS

| | | | |
|---|---|---|---|
| 2020/0053610 A1* | 2/2020 | Lyu | H04W 36/0069 |
| 2020/0305101 A1* | 9/2020 | Gage | H04W 76/11 |
| 2021/0099991 A1* | 4/2021 | Liu | H04W 72/51 |
| 2021/0235510 A1* | 7/2021 | Taherzadeh Boroujeni | H04W 72/0446 |
| 2022/0256610 A1* | 8/2022 | Lin | H04W 74/004 |
| 2023/0199862 A1* | 6/2023 | Li | H04W 52/08 370/329 |

FOREIGN PATENT DOCUMENTS

| | | |
|---|---|---|
| WO | 2019/226420 | 11/2019 |
| WO | 2020/050660 | 3/2020 |

\* cited by examiner

| Repetition Number | [$w_0, w_1, w_2, w_3, \ldots, w_{22}, w_{23}$] | |
|---|---|---|
| | Alt.1 | Alt.2 |
| R1 (e.g. 1) | <0, 0, 0, 0, ...,0, 0> | <0,1,1,0,1,1,0,1,1,0,1,1,0,1,1,0,1,1,0,1,1,0,1,1> |
| R2 (e.g. 2) | <0, 1, 0, 1,...,0, 1> | <1,0,1,1,0,1,1,0,1,1,0,1,1,0,1,1,0,1,1,0,1,1,0> |
| R3 (e.g. 4) | <1, 0, 1, 0, ..., 1, 0> | <1,1,0,1,1,0,1,1,0,1,1,0,1,1,0,1,1,0,1,1,0,1,1> |
| R4 (e.g. 8) | <1, 1, 1, 1, ..., 1, 1> | <0,0,0,0,0,0,0,0,0,0,0,0,0,0,0,0,0,0,0,0,0,0,0,0> |

$$i \bmod 2 = \begin{cases} 0 & \text{The Strongest SSB} \\ 1 & \text{The second SSB} \end{cases}, \quad i \leq \min(\alpha, 1-\alpha) * M_{total}$$

$i$: the SSB with larger MO numbers, if $i > \min(\alpha, 1-\alpha) * M_{total}$

Fig. 9a $$i = \begin{cases} 0 \ldots \lceil \alpha * M_{total} \rceil - 1 & \text{The Strongest SSB} \\ \lceil \alpha * M_{total} \rceil, \ldots, M_{total} - 1 & \text{The second SSB} \end{cases}$$

| Table 1: RV version determination for Msg2 repetition | | | | |
|---|---|---|---|---|
| RV field in | i=0 | i=1 | i=2 | i=3 |
| '00' | 0 | 1 | 2 | 3 |
| '01' | 0 | 2 | 1 | 3 |
| '10' | 0 | 3 | 1 | 2 |
| '11' | Reserved | | | |

| Table 2: RV version determination for Msg2 repetition | | | | |
|---|---|---|---|---|
| RV field in | i=0 | i=1 | i=2 | i=3 |
| '00' | 0 | 2 | 1 | 3 |
| '01' | 2 | 3 | 1 | 0 |
| '10' | 3 | 1 | 0 | 2 |
| '11' | Reserved | | | |

Fig. 13

RANDOM ACCESS MESSAGE TRANSMISSIONS FOR REDUCED CAPABILITY USER EQUIPMENT

BACKGROUND INFORMATION

Reduced capability (Redcap) devices, such as industrial wireless sensors, video surveillance, and wearables devices, typically have a reduced battery life and may be configured with various capabilities that require a smaller amount of power relative to devices supporting normal capabilities. Some Redcap devices may have a reduced number of receive/transmit (Rx/Tx) antennas and a reduced bandwidth, for example 20 MHz instead of 100 MHz (as with devices with normal capabilities), which may cause a significant coverage reduction and result in a smaller transport block size for downlink transmissions including unicast PDSCH and broadcast messages such as random access response (RAR) (Msg2) transmissions.

SUMMARY

Some exemplary embodiments are related to a processor configured to perform operations. The operations include performing measurements on a plurality of signal synchronization blocks (SSBs), selecting M physical random access channel (PRACH) groups based on one or more of the measured SSBs satisfying a predetermined threshold, providing the measurements for the M PRACH groups to a base station in an initial access transmission for a RACH procedure and monitoring for a random access response (RAR) message based on a repetition number for the RAR message indicated by the base station.

Other exemplary embodiments are related to a processor configured to perform operations. The operations include receiving, in an initial access transmission for a RACH procedure, measurements on a plurality of signal synchronization blocks (SSBs) for M physical random access channel (PRACH) groups selected by a user equipment (UE) based on one or more of the measured SSBs satisfying a predetermined threshold, indicating to the UE a repetition number for a random access response (RAR) message, wherein the UE monitors for the RAR message based on the repetition number and transmitting the RAR message with the repetition number.

DETAILED DESCRIPTION

The exemplary embodiments may be further understood with reference to the following description and the related appended drawings, wherein like elements are provided with the same reference numerals. The exemplary embodiments describe operations for determining a repetition number for random access (RACH) procedure transmissions from a base station such as random access response (RAR) messages (Msg2/MsgB). The repetition number may be signaled to a user equipment (UE) for determining monitoring occasions (MOs) for the RACH transmissions and may be based on signal synchronization block (SSB) measurements performed by the UE and reported to the base station. Certain embodiments are directed to either one or both of two-step or four-step RACH procedures.

Network/Devices

Figure 1:
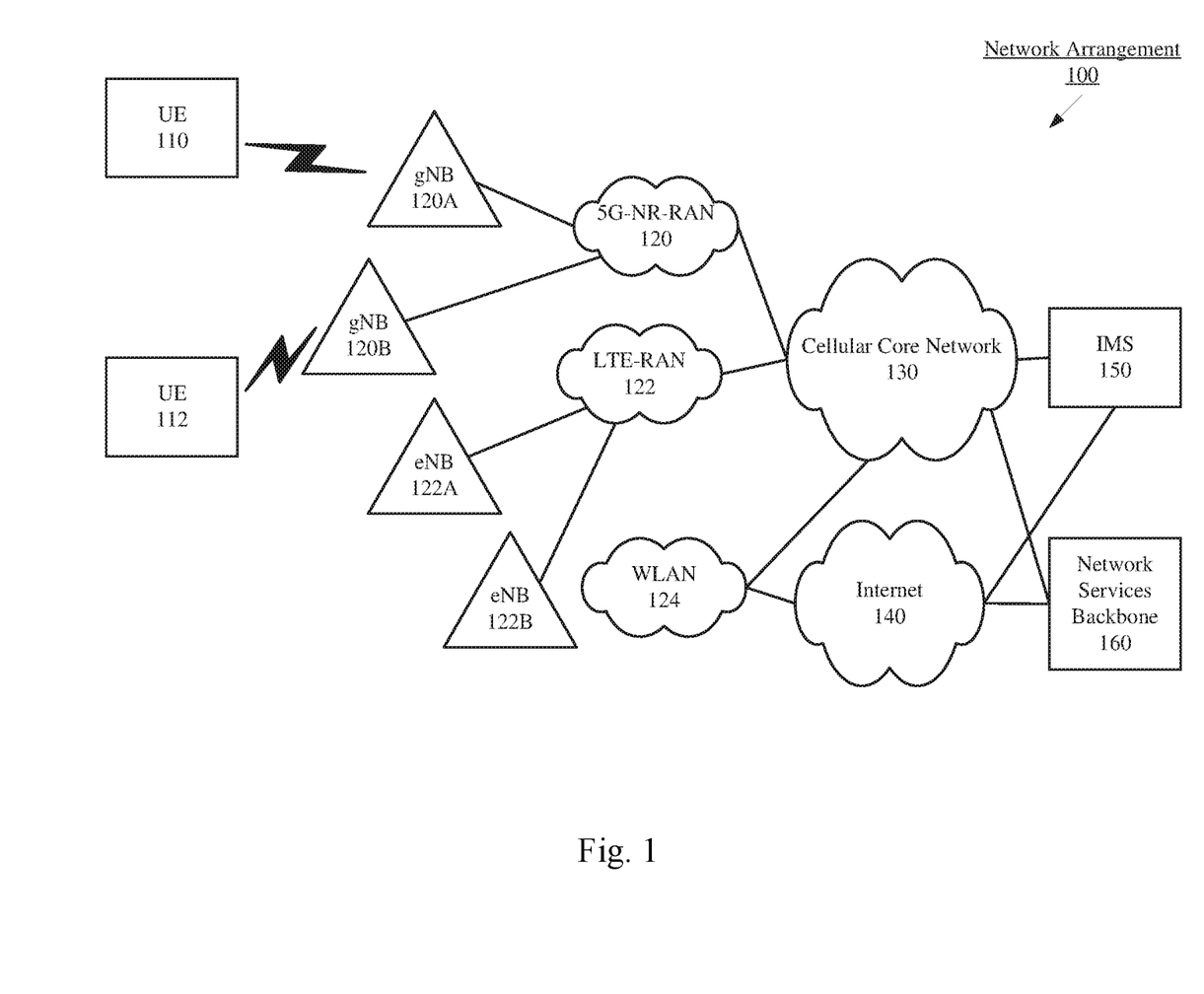
FIG. 1 shows an exemplary network arrangement according to various exemplary embodiments.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B. The UE 110 connection to the gNB 120A, according to certain exemplary embodiments, may be over a frequency greater than 52.6 GHz.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
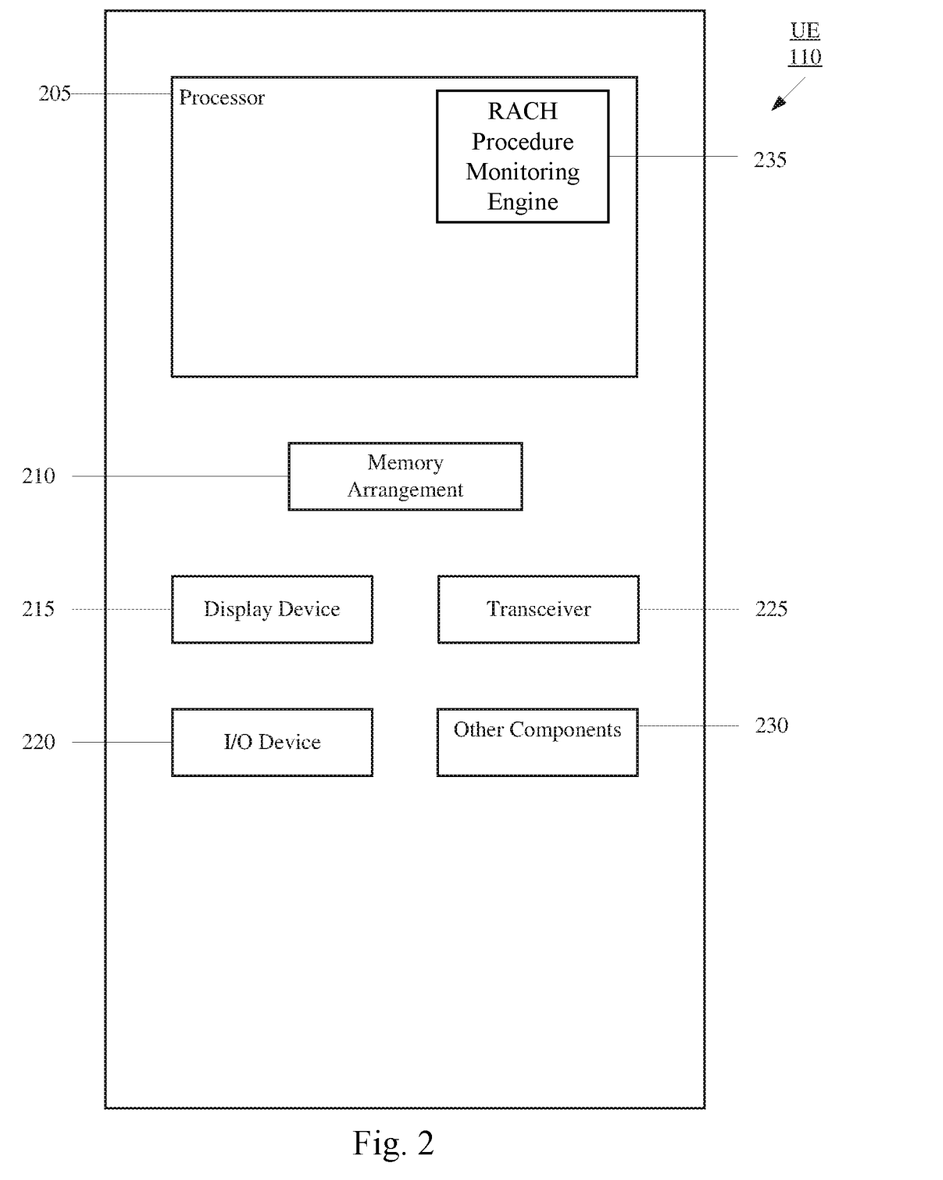
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a random access (RACH) procedure monitoring engine 235 for performing operations including selecting PRACH groups for the RACH procedure and monitoring for random access response (RAR) messages based on a repetition number indicated by a base station, to be described in detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
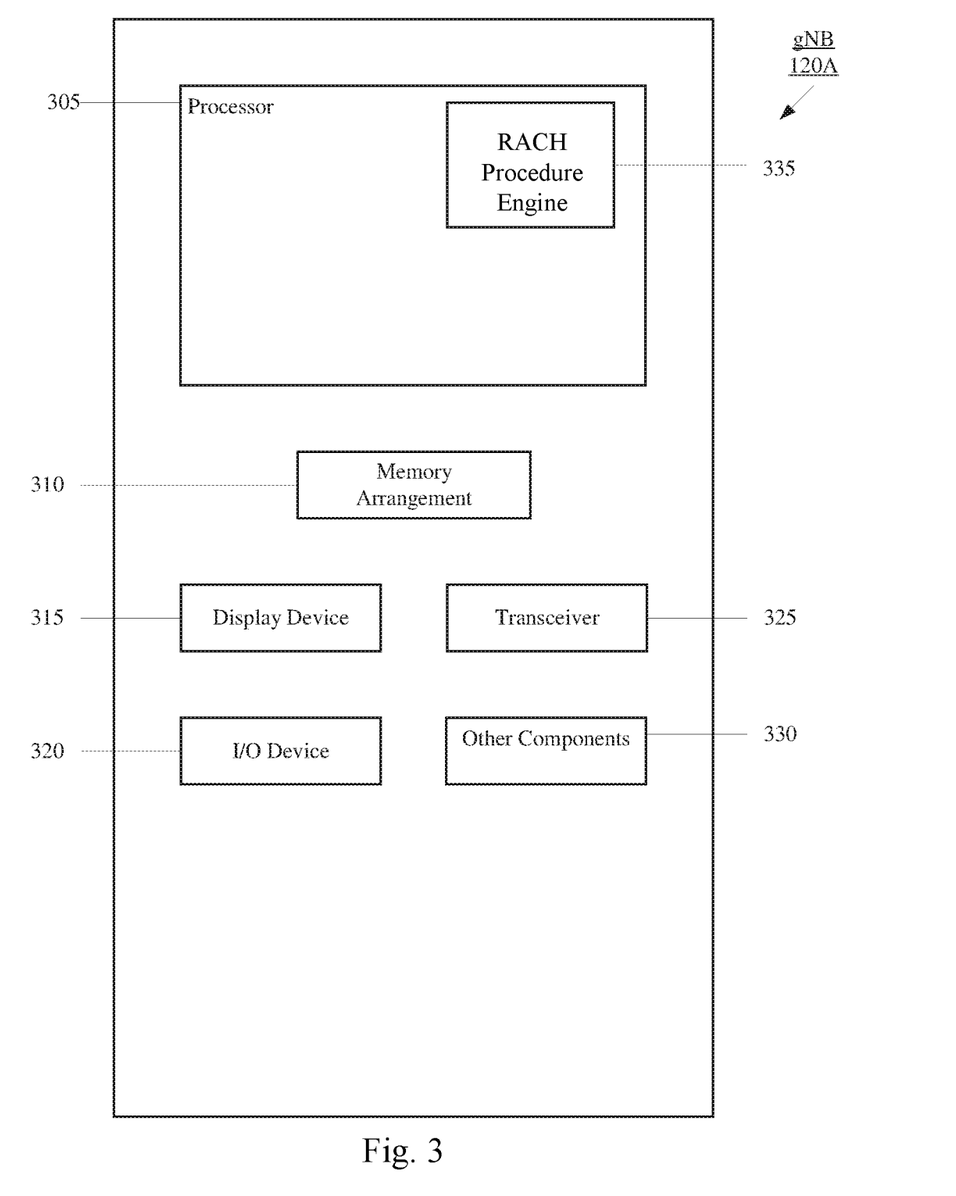
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a random access (RACH) procedure engine 335 for performing operations including receiving initial access message from a user equipment and transmitting random access response (RAR) messages with a given repetition number based on PRACH channel conditions, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

Random Access Procedure for Reduced Capability User Equipment

In the RAN 86 meeting, a work item "support of reduced capability NR devices" was approved for studying a user equipment (UE) feature and parameter list for devices with lower end capabilities, relative to Release 16 enhanced mobile broadband (eMBB) and ultra-reliable low latency communications (URLLC) New Radio (NR) devices, to serve use cases including industrial wireless sensors, video surveillance, and wearables devices with eMBB and/or URLLC functionality. More specifically, a list of potential UE reduction features were identified for further study, including a reduced number of UE receive/transmit (Rx/Tx) antennas, a UE bandwidth reduction, half-duplex frequency division duplexing (FDD), relaxed UE processing time, and relaxed UE processing capability.

Reducing a number of Rx antennas and bandwidth (e.g. reducing bandwidth from 100 MHz to 20 MHz) causes coverage reduction and results in a smaller transport block size (TBS) for not only unicast physical downlink shared channel (PDSCH) transmissions, but also broadcast messages, e.g., Msg2 random access response (RAR) transmission in a random access channel (RACH) procedure. When the number of Rx antennas is reduced to 1, the Msg2/Msg4 coverage is significantly impacted. Thus, there is a need to develop solutions to recover the coverage loss to facilitate the cell planning of the operator and achieve comparable coverage performance of Redcap UEs with regular eMBB UEs.

The UE sends a PRACH preamble as the first message from the UE to a base station when establishing initial access. In a contention-based random access (CBRA) procedure, the UE transmits the PRACH preamble (e.g. Msg1) with a preamble signature randomly selected by the UE from a pool of preambles shared with other UEs in the cell. In a contention-free RA (CFRA) procedure, the UE uses a dedicated preamble provided by the network specifically for the UE via, for example, Radio Resource Control (RRC) signaling or Downlink Control Information (DCI) on physical downlink control channel (PDCCH). In either procedure, the network responds to the detected RACH preamble (i.e. Msg1) with a random access response (RAR) (e.g. Msg2) on physical downlink shared channel (PDSCH) that is scheduled by a PDCCH and includes a resource allocation for a subsequent physical uplink shared channel (PUSCH) transmission by the UE (e.g. Msg3). In CBRA, the network performs contention resolution procedure and transmit Msg4 based on a UE identifier in the detected Msg3 PUSCH. Repetition techniques may be used by the base station for Msg2 and Msg4 for coverage enhancement (CE).

According to certain aspects of the present disclosure, prior to the initiation of a random access (RACH) procedure with a serving cell, a Redcap UE may have information for the available set of physical RACH (PRACH) resources available for the transmission of the RACH preamble (Msg1). According to some embodiments, the set of PRACH resources available for Redcap UE transmissions may be partitioned into one or multiple groups. The different PRACH groups may be multiplexed in the same physical resource blocks (PRBs) by using different cyclic shifts between the PRACH groups in a code division multiplexing (CDM) manner. Alternatively, the different PRACH groups may be frequency division multiplexed (FDM) or time division multiplexed (TDM).

Figure 4:
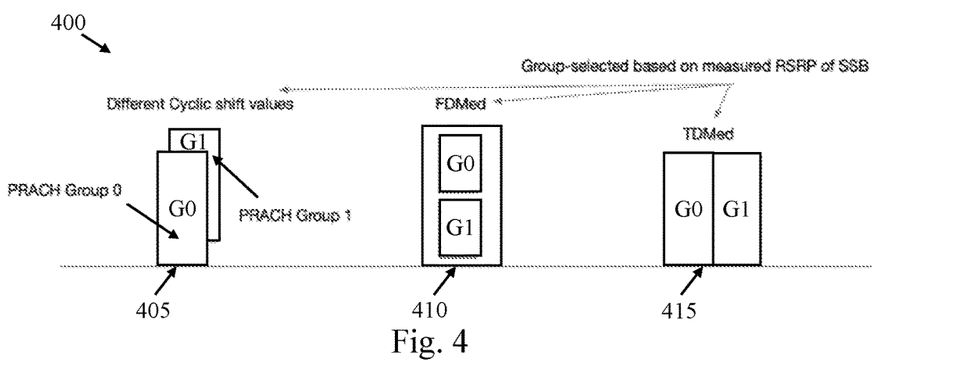
FIG. 4 shows exemplary multiplexing configurations for two PRACH groups according to various exemplary embodiments.

FIG. 4 shows exemplary multiplexing configurations 400 for two PRACH groups according to various exemplary embodiments. As shown in 405, the first and second PRACH groups may be multiplexed using CDM with different cyclic shift (CS) values. As shown in 410 and 415, the first and second PRACH groups may be multiplexed using FDM or TDM. In each of the three scenarios, the PRACH groups may be selected based on a measured RSRP of a system synchronization block (SSB), to be explained in further detail below.

The PRACH resource groups may be mapped into coverage recovery levels (e.g. maximum repetition numbers) for the associated Msg2 and/or Msg4 transmission. The PRACH resource group mapping may be determined in the following manner. A number of reference signal received power (RSRP) thresholds may be defined, for example, in the parameter rsrp-ThresholdsSSBInfoList. These RSRP thresholds may be transmitted to the UE in a system information block (SIB), e.g., SIB1, prior to the beginning of the RACH procedure. In some embodiments, the RSRP thresholds may be defined by standard (e.g., 3GPP Standards). The UE may also receive criteria to select a corresponding PRACH group index based on the RSRP measurement result, e.g., may be also included in the parameter rsrp-ThresholdsSSBInfoList. The UE may select a corresponding PRACH group based on measured RSRP value(s) of the synchronization signal block(s) (SSB(s)) that satisfy the threshold to assist the gNB in determining the repetition number of Msg2 and Msg4 transmission in RACH procedure. The following configurations may also be separately provided in a SIB for different PRACH groups to support different values: RA response (RAR) (e.g. Msg2) window size, and the maximum repetition number of Msg2/Msg4 transmissions.

According to some exemplary embodiments, a variety of approaches can be considered to indicate the repetition number for Msg2 transmissions. In a first option, the repetition number may be fixed to be the maximum value signaled in the SIB message as described above.

In a second option, the repetition number may be dynamically indicated using X-bits in the scheduling DCI Format 1_0 with a cyclic redundancy check (CRC) scrambled by a random access (RA) Radio Network Temporary Identifier (RNTI) (RA-RNTI) or MsgB-RNTI. For the second option, in some embodiments, X-bits of reserved bits in the DCI Format 1_0 (16 bits for RA-RNTI and 14 bits for MsgB-RNTI) may be re-purposed to indicate the actual repetition number of Msg2 and/or Msg4 transmissions. The number of bits may be defined by $X=\lceil \log_2(I) \rceil$, where I represents the total number of repetitions, which may be defined by standard (e.g., 3GPP Standards) or signaled in SIB1 on a per serving cell basis. For example, when I=4, the bits may represent repetition numbers as {1,2,4,Reserved}.

Figure 5:
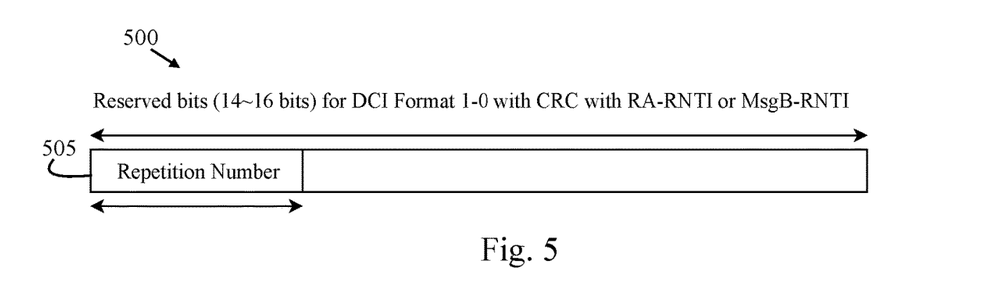
FIG. 5 shows an exemplary repurposing of the reserved bits in a DCI Format 1_0 according to various exemplary embodiments.

FIG. 5 shows an exemplary repurposing of the reserved bits 500 in a DCI Format 1_0 according to various exemplary embodiments. The DCI Format 1_0 has either 14 or 16 reserved bits, depending on whether the scrambling sequence is RA-RNTI or MsgB-RNTI. A repetition number field 505 is introduced which comprises X-bits, depending on the I value, e.g. I=4, as described above.

Figure 6:
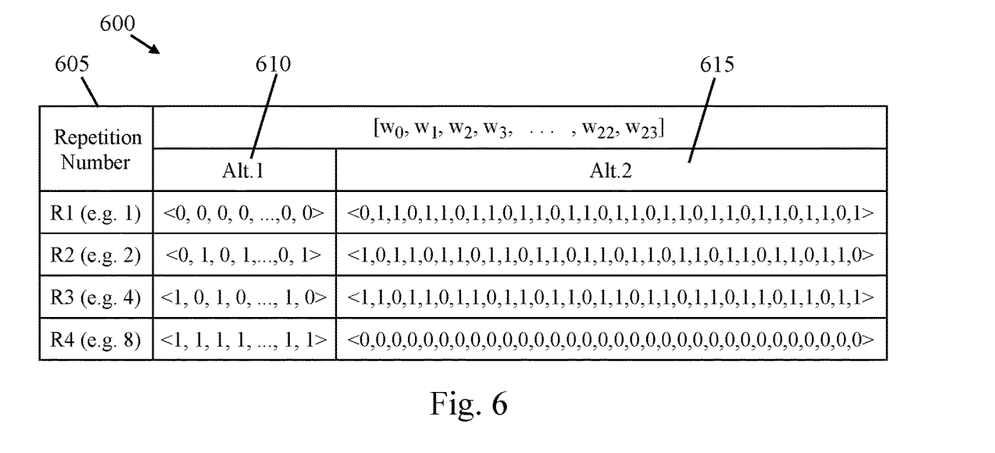
FIG. 6 shows a table for indicating a repetition number using one of two different scrambling sequences according to various exemplary embodiments.

For the second option, in other embodiments, the repetition number may be carried by a scrambling sequence [$w_0$, $w_1$, . . . , $w_{23}$] to scramble the cyclic redundancy check (CRC) bits of the DCI Format 1_0. FIG. 6 shows a table 600 for indicating a repetition number using one of two different scrambling sequences. Column 605 shows a repetition number, e.g. R1, R2, R3 or R4. Column 610 shows a first scrambling sequence and column 615 shows a second scrambling sequence for the corresponding repetition number.

Different approaches may be considered to improve the Msg2 performance with a given 'K' repetitions. According to some exemplary embodiments, a repetition number-dependent resource determination may be used in the frequency domain. When the information element (IE) of 'VRB-to-PRB mapping' in the DCI format 1_0 is set to be '1' (indicating interleaved VRB-to-PRB) mapping, the virtual resource block (VRB) bundle $j \in \{0, 1, \ldots, N_{bundle}-1\}$ is mapped to the physical resource block (PRB) bundle based on the equation $j=f(i,j)=rC+c+\Delta_i$, where $i \in \{0, \ldots, K-1\}$ represents the retransmission index. In this embodiment, $\Delta_i=(C^*i)/K$. Parameter $j=cR+r$, where $r=0, 1, \ldots, R-1$, and $C=[N_{bundle}/R$. In some embodiments, $N_{bundle}=[N_{BWP,init}^{size}/L$ where L is the bundle size of RB for VRB.

Figure 7:
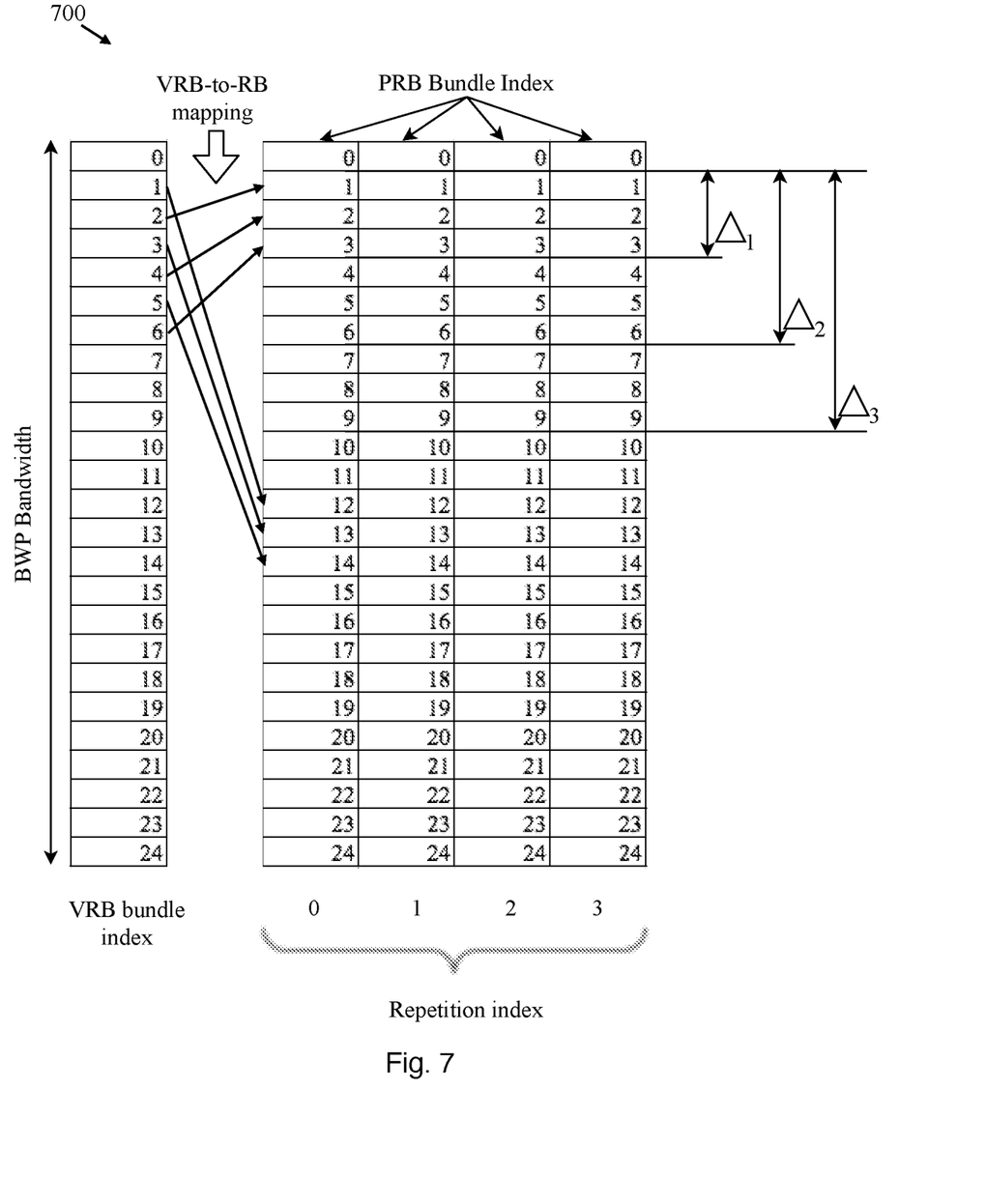
FIG. 7 shows an exemplary frequency domain resource allocation (FDRA) for Msg2 repetitions according to various exemplary embodiments.

FIG. 7 shows an exemplary frequency domain resource allocation (FDRA) 700 for Msg2 repetitions according to various exemplary embodiments. In the exemplary FDRA 700, it is assumed that $N_{BWP,init}^{size}=50$, $L=2$, $N_{bundle}=25$ and $K=4$. According to the equations described above, $\Delta_i=(C^*i)/K \in [0,3,6,9]$, and resources in the frequency domain are shifted across different repetitions. Thus, referring to FIG. 7, each bundle includes 25 PRBs (e.g., $N_{bundle}=25$) as labeled (0-24) by the VRB bundle index on the left. There are 4 repetitions (e.g., K=4) of the bundles as labeled (0-3) by the repetition index on the bottom. It may then be considered that for repetition K=0, the VRB indexed blocks 2, 4, 6 are mapped to PRBs 1, 2, 3, respectively. For repetition K=1, the VRB indexed blocks 2, 4, 6 are mapped to PRBs 4, 5, 6, respectively. Thus, for repetition K=1, $\Delta_1=3$. For repetition K=2, the VRB indexed blocks 2, 4, 6 are mapped to PRBs 7, 8, 9, respectively. Thus, for repetition K=2, $\Delta_2=6$. For repetition K=3, the VRB indexed blocks 2, 4, 6 are mapped to PRBs 10, 11, 12, respectively. Thus, for repetition K=3, $\Delta_3=9$. Thus, this example shows how resources in frequency domain may be shifted across different repetitions.

According to other exemplary embodiments, a multi-beam/multi-TRP (transmit and reception point) repetition may be used for Msg2/MsgB transmission. A first scenario relates to MsgB repetition in a Type-2 random access (RACH) procedure.

Figure 8:
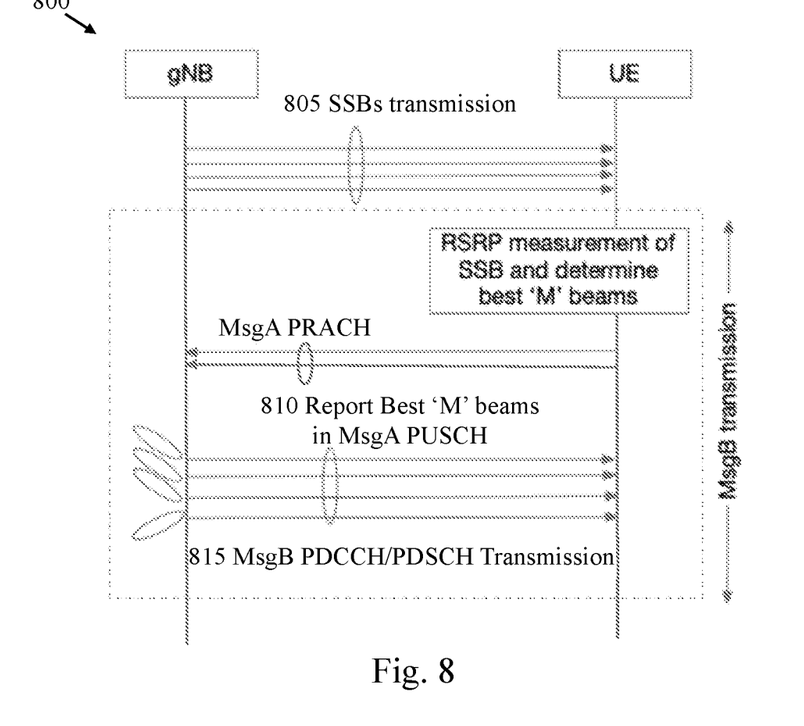
FIG. 8 shows a signaling diagram for a multi-beam/multi-TRP repetition for MsgB repetition in an exemplary two-step RACH procedure according to various exemplary embodiments.

FIG. 8 shows a signaling diagram 800 for a multi-beam/multi-TRP repetition for MsgB repetition in an exemplary two-step RACH procedure according to various exemplary embodiments. Prior to the signaling shown in 800, the UE may be provided by a SIB, e.g., SIB1, whether Multi-beam/Multi-TRP based retransmission for Msg2 or MsgB repetition is enabled. In 805, the UE receives SSB transmissions from the serving cell. Those skilled in the art will understand that each SSB may correspond to a beam. The UE will measure the RSRP for each SSB and select the 'M' best RSRP measurements results. Typically, the best generally means the highest measured RSRP values. However, it should be understood that the RSRP values may be evaluated in a different manner to determine the M best values.

In 810, the UE may provide, to the gNB, the M best RSRP values including the SS/PBCH block indexes in a MsgA PUSCH after transmitting the selected MsgA PRACH. In this example, it may be considered that M=2.

In 815, in response to the PRACH transmission, the gNB transmits MsgB PDCCH/PDSCH and the UE attempts to detect a DCI Format 1_0 with a CRC scrambled by a corresponding RA-RNTI during a random access response (RAR) window, assuming different spatial relations. The detection of the DCI Format 1_0 may be performed in various manners.

In some exemplary embodiments, the UE may detect the DCI Format 1_0 by evenly splitting the monitoring occasions (MOs) within the RAR window and MsgB repetitions in the time domain for different spatial relations. To continue with the above example where M=2, the UE may split the MOs within the RAR window and MsgB repetitions using Quasi Co-location (QCL) with the SSB having the best RSRP value and the SSB having the second best RSRP value.

In other exemplary embodiments, the UE may detect the DCI Format 1_0 by unevenly splitting the PDCCH MOs and MsgB repetitions for different beams/TRPs with different SSB indexes. In some exemplary embodiments, a set of uneven splitting patterns of PDCCH MOs and/or MsgB repetitions may be defined in standards (e.g., 3GPP standards) or configured in SIB information. One or more of these splitting patterns may be dynamically signaled in scheduling DCI Format 1_0 by repurposing the reserved bits, in a similar manner as shown above in FIG. 4.

For example, a splitting factor $\alpha \in \{1/4, 1/2, 3/4, 1\}$ may be introduced and signaled in the SIB to determine the PDCCH MOs and MsgB repetition, as shown in the equations $M_{ssb,0}=\alpha^*M_{total}$; $M_{ssb,1}=(1-\alpha)^*M_{total}$, where $M_{ssb,0}$ represents the MO that is QCLed with the best/strongest SSB and $M_{ssb,1}$ represents the MOs that are QCLed with the second best SSB within the SSBs reported by the UE in 810 of the method 800 described above.

Figure 9A:
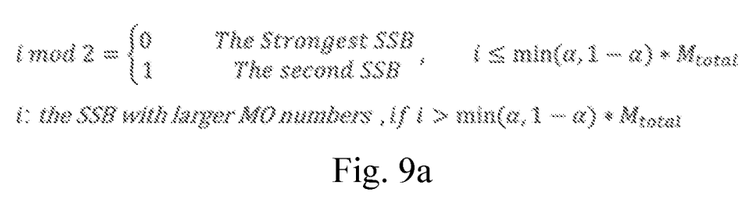
FIG. 9*a* shows an interleaved pattern for FDRA resource mapping according to various exemplary embodiments.
Figure 9B:
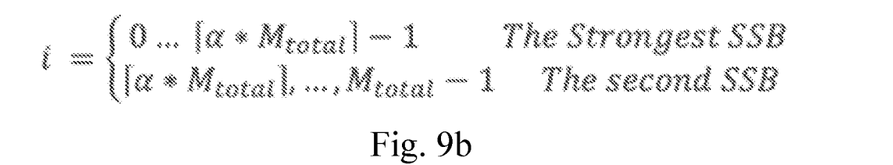
FIG. 9*b* shows a non-interleaved pattern for FDRA resource mapping according to various exemplary embodiments.

In addition, different mapping patterns may be defined to determine the exact time domain location for each MO with a different spatial QCL relation, balancing the random access latency and resource efficiency and taking into account the UL beam switching delay. FIG. 9a shows an interleaved pattern for FDRA resource mapping according to various exemplary embodiments. FIG. 9b shows a non-interleaved pattern for FDRA resource mapping according to various exemplary embodiments. Examples of the interleaved pattern and the non-interleaved pattern will be described below.

Figure 10:
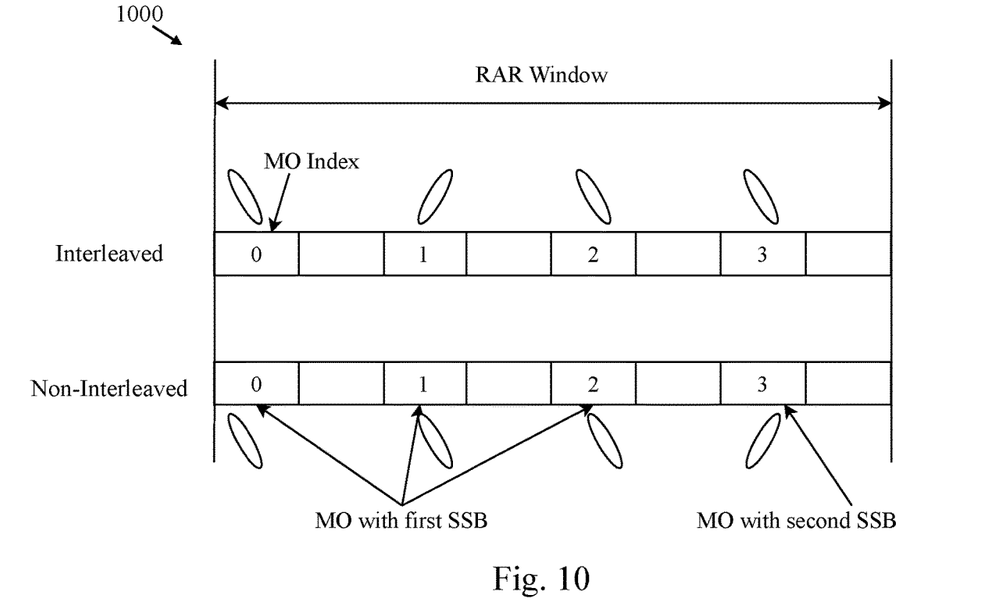
FIG. 10 shows an exemplary PDCCH MO split operation between different QCL assumptions associated with two SSBs reported by the UE according to various exemplary embodiments.

FIG. 10 shows an exemplary PDCCH MO split operation 1000 between different QCL assumptions associated with two SSBs reported by the UE according to various exemplary embodiments. In the exemplary operation 1000, it may be considered that $\alpha=3/4$, $M_{total}=4$, and Multi-TRP repetition is enabled, as signaled in the SIB. Based on the exemplary two-step RACH procedure discussed above, the UE reports the best M=2 beams in the MsgA PUSCH. Then, the UE monitors the PDCCH MOs with different spatial relations in accordance with the interleaved or the non-interleaved patterns discussed above. As shown in FIG. 10, when the interleaved pattern is used, the UE monitors with the first SSB at MO indexes 0, 2 and 3 within the RAR window and the second SSB at MO index 1. When the non-interleaved pattern is used, the UE monitors the first SSB at MO indexes 0, 1 and 2 within the RAR window and the second SSB at MO index 3.

In a similar operation, the splitting-factor based approach may be extended for MsgB RAR transmission over the PDSCH. In some exemplary embodiments, a common splitting factor may be used for both MsgB PDCCH MO and MsgB PDSCH repetition. In other designs, separate splitting factors may be configured for MsgB PDCCH MO (e.g. in SIB1) and MsgB PDSCH repetition, e.g. $\alpha_1$ in SIB1 and $\alpha_2$ in DCI Format 1_0.

Figure 11:
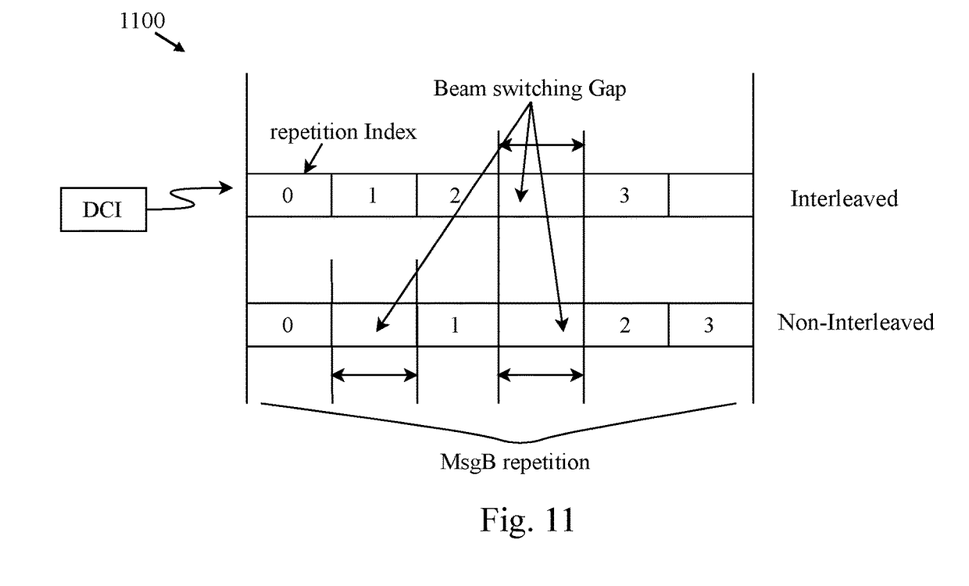
FIG. 11 shows an exemplary MsgB repetition split operation according to various exemplary embodiments.

FIG. 11 shows an exemplary MsgB repetition split operation 1100 according to various exemplary embodiments. In the exemplary operation 1100, it may be considered that a common factor is used for indicating $\alpha=\frac{3}{4}$, I=4. In the example of FIG. 11, it can be seen that the interleaved case has a fewer number of gaps for beam switching. However, this is only one example and there may be scenarios where the non-interleaved case has fewer switching gaps for the MsgB repetitions. Thus, different scenarios may use different exemplary embodiments.

According to other exemplary embodiments, Msg2 may be sent with a number of repetitions in the time domain. In a first option, for Msg2 repetition, a same symbol allocation (regardless of Type A or Type B RA) may be applied across the consecutive slots if they are associated with a same spatial relation. In a second option, the time domain location may be determined based on the starting and length indicator value (SLIV) indicated by the scheduling DCI Format 1_0, as detailed in the following. The slot where the repetition starts is given by $n_0+[(S+k*L)/N_{symb}^{slot}$ and the starting symbol relative to the start of each consecutive slot is given by mod S+i*L, where i=0, . . . , $[N_{symb}^{slot}-S)/L]-1$. This equation guarantees that a single repetition is not at a cross slot boundary to reduce RS overhead. The slot where the repetition ends is given by $n_0+[K/((N_{symb}^{slot}-S)/L]-1$. The ending symbol relative to the start of the slot is given by $S+mod(K,[(N_{symb}^{slot}-S)/L]*L$.

Figure 12:
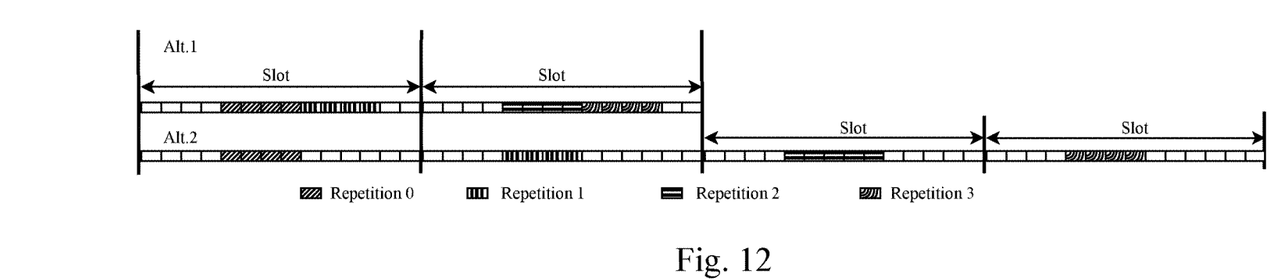
FIG. 12 shows examples of different alternatives for Msg2/MsgB transmissions according to various exemplary embodiments.

FIG. 12 shows examples of different alternatives using row-6 in existing default TDRA Table 5.1.2.1.1-2 for Msg2/MsgB transmissions in Rel-15/Rel-16, assuming K=4 repetitions in accordance with the equations discussed above.

Figure 13:
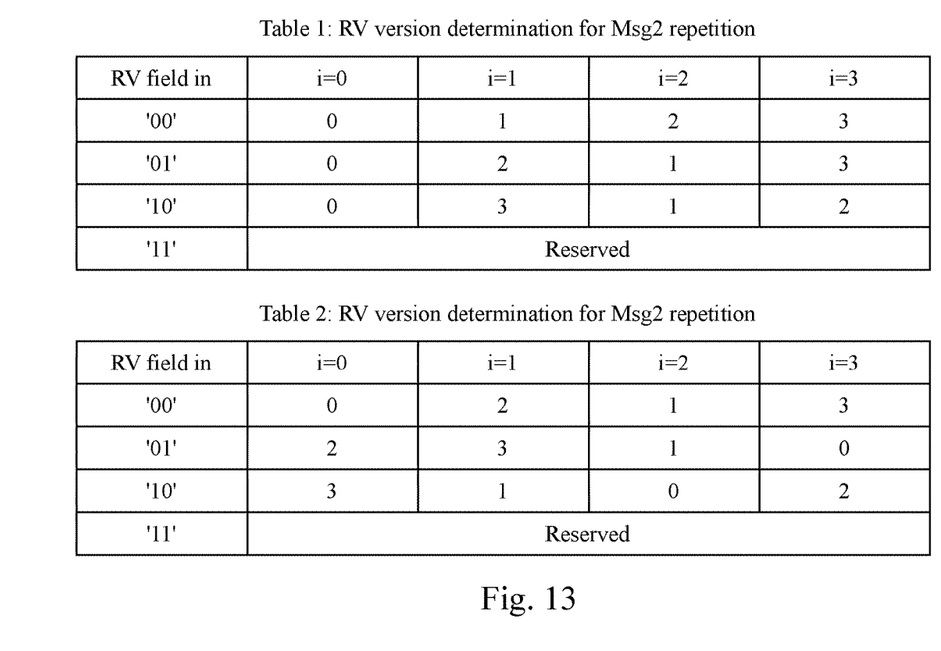
FIG. 13 shows tables for redundant version determination for Msg2 repetitions according to various exemplary embodiments.

A redundancy version (RV) for repetitions may be determined in the following manner for Msg2 repetition. The redundant version to be applied on the k-th repetition with a same spatial relation (k∈0, . . . , K−1) is determined based on the RV field signaling by the scheduling DCI Format 1_0 as shown in Tables 1/2 of FIG. 13. In other designs, the RV sequence may be hard encoded in specification e.g. using the sequence of <0,3,1,2>. It should be noted that the RV sequence should be restarted for retransmission if it is assumed to be QCLed with different spatial relation(s). Table 2 is motivated by the design that repetitions may be triggered by independent DCI Format with indicating the remaining repetitions and associated RV sequence.

According to certain aspects of the present disclosure, a smaller scaling factor may be introduced and indicated using the unused state "11" in DCI Format 1_0 with CRC scrambled by RA-RNTI or MsgB-RNTI, and hence the increased number of PRBs can be used to transmit Msg2 or MsgB with lower the code rate without repetition in time domain. In some examples, S=0.125.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor configured to perform operations comprising:
    receiving an indication of whether a multi-beam or multi-transmit-and-reception-point (multi-TRP) retransmission is enabled;
    performing measurements on a plurality of signal synchronization blocks (SSBs);
    selecting M physical random access channel (PRACH) groups based on one or more of the measured SSBs satisfying a predetermined threshold;
    providing the measurements for the M PRACH groups to a base station in an initial access transmission for a RACH procedure;
    monitoring for a random access response (RAR) message based on a repetition number for the RAR message indicated by the base station; and
    splitting monitoring occasions (MO) for the RAR message across the M PRACH groups.

2. The processor of claim 1, wherein the measurements comprise reference signal received power (RSRP) measurements and the predetermined threshold for the RSRP measurements is either hard-encoded in a specification or signaled in a system information block (SIB) and is based on the selected PRACH group.

3. The processor of claim 2, wherein a maximum repetition number for the RAR message or a RAR message window size is provided in the SIB.

4. The processor of claim 3, wherein the repetition number to be used for the RAR message is fixed as the maximum repetition number or dynamically indicated in a scheduling downlink control information (DCI) Format 1_0.

5. The processor of claim 4, wherein the DCI Format 1_0 comprises X reserved bits repurposed to indicate the repetition number, the value of X being based on a radio network temporary identifier (RNTI).

6. The processor of claim 4, wherein the repetition number is carried by a scrambling sequence to scramble cyclic redundancy check (CRC) bits in the DCI Format 1_0.

7. The processor of claim 1, wherein a frequency domain resource allocation (FDRA) for the RAR message comprises frequency resources being shifted across different repetitions of the RAR message.

8. The processor of claim 1, wherein the MOs for the RAR message are evenly split across the PRACH groups in a time domain for different spatial relations.

9. The processor of claim 1, wherein the MOs for the RAR message are unevenly split across the PRACH groups in a time domain based on a splitting pattern,
wherein the splitting pattern is either one of hard-encoded in a specification or dynamically signaled in a scheduling DCI Format 1_0,
wherein the splitting pattern comprises an interleaved pattern or a non-interleaved pattern.

10. The processor of claim 1, wherein, for a time domain, a same symbol allocation is applied across consecutive slots if the slots are associated with a same spatial relation.

11. A processor configured to perform operations comprising:
receiving, in an initial access transmission for a RACH procedure, measurements on a plurality of signal synchronization blocks (SSBs) for M physical random access channel (PRACH) groups selected by a user equipment (UE) based on one or more of the measured SSBs satisfying a predetermined threshold;
indicating to the UE a repetition number for a random access response (RAR) message, wherein the UE monitors for the RAR message based on the repetition number;
indicating whether a multi-beam or multi-transmit-and-reception-point (multi-TRP) retransmission is enabled, wherein the UE splits monitoring occasions (MO) for the RAR message across the M PRACH groups based on the indication; and
transmitting the RAR message with the repetition number.

12. The processor of claim 11, wherein the measurements comprise reference signal received power (RSRP) measurements and the predetermined threshold for the RSRP measurements is either hard-encoded in a UE specification or signaled to the UE in a system information block (SIB) and is based on the selected PRACH group.

13. The processor of claim 12, wherein a maximum repetition number for the RAR message or a RAR message window size is provided in the SIB.

14. The processor of claim 13, wherein the repetition number to be used for the RAR message is fixed as the maximum repetition number or dynamically indicated in a scheduling downlink control information (DCI) Format 1_0.

15. The processor of claim 11, wherein, for a time domain, a same symbol allocation is applied across consecutive slots if the slots are associated with a same spatial relation.

16. The processor of claim 11, wherein a redundant version (RV) for the RAR message is applied based on an RV field signaled in a scheduling DCI Format 1_0.

* * * * *